United States Patent

Diblitz et al.

[11] Patent Number: 5,807,958
[45] Date of Patent: Sep. 15, 1998

[54] CATALYSTS FOR THE MANUFACTURE OF POLYURETHANES AND/OR POLYUREAS

[75] Inventors: Klaus Diblitz, Schenefeld; Peter Finmans, Rheinberg, both of Germany

[73] Assignee: Air Products and Chemicals, Inc., Allentown, Pa.

[21] Appl. No.: 904,701

[22] Filed: Aug. 1, 1997

Related U.S. Application Data

[63] Continuation of Ser. No. 428,222, filed as PCT/DE94/00937, Aug. 12, 1994, abandoned.

[30] Foreign Application Priority Data

Sep. 2, 1993 [DE] Germany ............................ 4329624.6

[51] Int. Cl.$^6$ .............................. C08G 18/22; C08J 9/04; C08K 5/098
[52] U.S. Cl. .......................... 528/571; 521/114; 521/125; 521/130; 521/170
[58] Field of Search ..................... 521/114, 125, 521/130, 170; 528/57

[56] References Cited

U.S. PATENT DOCUMENTS

| | | | |
|---|---|---|---|
| 3,239,480 | 3/1966 | Windemuth et al. | 528/57 |
| 3,400,157 | 9/1968 | Poppelsdorf | 564/486 |
| 3,645,925 | 2/1972 | Speranza et al. | 521/115 |
| 3,786,029 | 1/1974 | Bechara et al. | 528/53 |
| 4,166,164 | 8/1979 | Cenker et al. | 521/125 |
| 4,223,098 | 9/1980 | Treadwell et al. | 521/116 |
| 4,336,341 | 6/1982 | Fujiwara et al. | 521/109 |
| 4,868,043 | 9/1989 | Eling et al. | 428/304 |
| 5,244,931 | 9/1993 | Kuyzin | 521/114 |

FOREIGN PATENT DOCUMENTS

| | | |
|---|---|---|
| 3938203 | 5/1991 | Germany . |
| 770526 | 3/1957 | United Kingdom . |

OTHER PUBLICATIONS

J.H. Saunders and K. C. Frisch, Polyurethane Chemistry and Technology, p. 73 ff, 1962.
R. L. Zimmerman, T. H. Austin, J. Cell Plast. 24(3), pp. 256–265, May 1988.
A. Christfreund, E. Huygen, B. Eling, Cell. Polymer. 10(6) 452–65, 1991.
R. G. Petrella, J. D. Tobias, J. of Cellular Plastics, 25, 421–40, Sep. 1989.
C. G. G. Colvin, Cell Polym. 11(1) pp. 29–56, 1992.
J. Bechara, J. Cell Plast, Mar./Apr. 103 1979.

*Primary Examiner*—Rabon Sergent
*Attorney, Agent, or Firm*—Michael Leach

[57] ABSTRACT

Alkaline metal and alkaline earth metal salts of alkyl and alkenyl succinic acids as catalysts for the manufacture of polyurethanes and/or polyureas are provided. Said catalysts are particularly suitable for manufacturing foams of said polymers and have a favorable influence on the cell structures of said materials.

14 Claims, No Drawings

CATALYSTS FOR THE MANUFACTURE OF POLYURETHANES AND/OR POLYUREAS

This is a continuation of application Ser. No. 08/428,222, filed as PCT/DE94/00937, Aug. 12, 1994, now abandoned.

The present invention relates to catalysts for the manufacture of polyurethanes and/or polyureas, and particularly for the manufacture of such foams.

It is known that a great number of organic, organometallic and inorganic compounds can be used as catalysts in the production of polyurethanes (J. H. Saunders and K. C. Frisch, Polyurethanes Chemistry and Technology, p. 73 ff, 1962). From the group of organic compounds tertiary amines, such as bis(dimethylaminoethyl)ether (U.S. Pat. No. 3,400,157), amino-ortho-ester (U.S. Pat. No. 3,786,029) and ββ'-dimorpholinodiethyl-ester (German Offenlegungsschrift DE-OS 2 138 403) are referred to. Other catalytically active substances may be derivatives of organic acids, such as potassium acetate or potassium-2-ethylhexanoate. Examples for metal catalysts are Sn(II)/Sn(IV) salts or FE(III) salts (German offenlegungsschrift DE-OS 3 938 203).

The catalysts used at present have many disadvantages. Amines, like bis(dimethylaminoethyl)ester, or triethylenediamine, have a negative impact on the polyvinylchloride sheets used for laminating polyurethane foams, e.g. discoloration of the sheets and impairment of the mechanical properties, e.g. elasticity (R. L. Zimmerman, T. H. Austin, J. Cell. Plast., 24 (3), p. 256–65, 1988). The reason for said effects is the migration of the amine catalysts into the sheet where they cause hydrochloric acid to split off from the polymer. The polyolefins thus formed will result in discoloration and higher crosslinking whereby the elasticity is reduced and undesired embrittlement occurs.

When using amine catalysts comprising substituents which are capable of reacting with the isocyanate group, the undesired effects described above may be reduced in individual cases (R. L. Zimmerman, T. H. Austin, J. Cell. Plast., see above), but complete resistance to discoloration and retention of the sheet properties are not achieved (A. Christfreund, E. Huygens, B. Eling, Cell. Polym., 10 (6), 452–65, 1991, and R. G. Petrella, J. D. Tobias, J. of Cellular Plastics, 25, 421–40, 1989).

When using catalysts other than amine catalysts for producing foamed polyurethane and/or polyurea materials, the disadvantages are also significant. For instance, organometallic compounds, like dibutyl tin dilaurate (DBTL), will result in discoloration of the sheets (C. B. C. Colvin, Cell. Polym., 11 (1), p. 29–56, 1992).

In addition, metal salts of carboxylic acids also present disadvantages. It is known that proper catalytic control of the reaction of is ocyanates with hydroxy groups, such as polyols or chain extenders, and the reaction of isocyanates with water is very important for the production of cellular polyurethane and/or polyurea materials. It is also known that metal salts of carboxylic acids, like potassium acetate, are good catalysts for the isocyanate-water blowing reaction (J. Bechara, J. Cell. Plast., March/April, p. 103, 1979) but are unsatisfactory as catalysts for the important isocyanate-polyol or chain extender gelling reaction.

In practice, the processing parameters, such as cream time or foam inition time, gelation time and rise time, which are important for the manufacture of moldings of polyurethane back-foamed polyvinylchloride are not attained if the catalysis of the blowing and gelling reactions is unbalanced. Potassium acetate as a catalyst does ensure a cream time complying with the technical requirements, but the gelation time is too short resulting in insufficient flow of the foamable polyurethane mass. Potassium-2-ethylhexanoate, on the other hand, also ensures the cream times required in practice, but will result in too long gelation and rise times.

Another disadvantage of the metal salts of carboxylic acids is their limited solubility in polyol formulations used for manufacturing cellular polyurethanes and/or ureas. Typically, said formulations which are also termed 'component A' are comprised of one or more polyols, optionally of one or more chain extenders, and of cell stabilizers and water, and, optionally, other additives and fillers. As a result of its nonpolar character, such a mixture has only limited solubility in comparison with high-polar compounds, such as the salts mentioned hereinabove. This will result in partial or complete precipitation of the abovementioned carboxylic acid salts whereby the activity will significantly decrease.

The purpose of this invention is to develop novel catalysts which are suitable for the manufacture of polyurethanes and polyureas and do not present the disadvantages mentioned hereinabove.

The problem is solved as defined by claim 1 by providing catalysts comprised of alkaline metal and alkaline earth metal salts of alkyl—or alkenyl succinic acids.

Subject matter of this invention is particularly the use of the aforesaid compounds as catalysts for the manufacture of polymers comprising cellular urethane—and/or urea groups.

The succinic acid compounds I and II provided for this purpose have the following chemical structures:

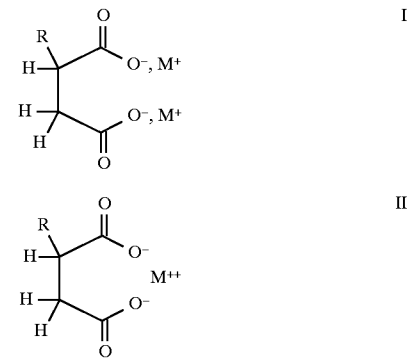

wherein R represents a branched or an unbranched alkyl group of 1 to 30 carbon atoms, a branched or an unbranched alkenyl group of 2 to 30 carbon atoms, or a branched or an unbranched alkyl ether—or alkenyl ether group of 2 to 30 carbon atoms and 1 to 6 oxygen atoms, $M^+$ represents a metal cation from the first main group of the periodic system, and $M^{++}$ represents a metal cation from the second main group of the periodic system.

In the compounds of the general formulas I and II

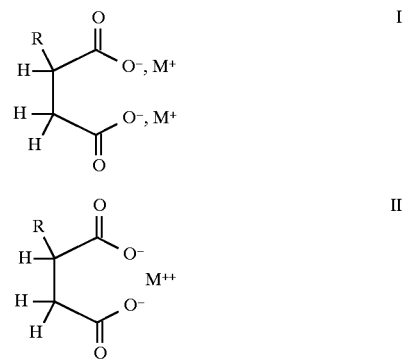

used according to this invent on, R preferably represents a branched or an unbranched alkyl group of 1 to 20, particularly 1 to 10 car bon atoms, a branched or an unbranched alkenyl group of 2 to 20, particularly 2 to 10 carbon atoms, or a branched or an unbranched alkyl ether— or alkenyl ether group of 2 to 20, particularly 2 to 10 carbon atoms, and 1 to 3 oxygen atoms, $M^+$ preferably represents the sodium cation and the potassium cation, and $M^{++}$ preferably represents the calcium cation and the magnesium cation. The potassium cation and the magnesium cation are particularly preferred as $M^+$ and $M^{++}$, respectively.

The catalysts of the invention and the mixtures thereof present surprising characteristics as catalysts:

1. the catalysts have sufficiently high activities;
2. the catalysts when used in polyurethane/polyurea systems for back-foaming of polyvinylchloride sheets do not produce discoloration, nor do they impair the physical properties of the sheets;
3. the catalysts have high gelling activities and thus bring about the high tensile strength of the foam required in practice
4. the catalysts are soluble and stable in storage in the mixture of polyols and other additives;
5. the catalysts are capable of influencing the cell structures of the foams in a favorable way.

The catalysts of the invention can be obtained by reacting accordingly substituted succinic acids or the anhydrides thereof with hydroxide salts of the metals of the first or second main group.

Suitable alkyl—or alkenyl succinic acids or—anhydrides are e.g. diisobutenyl succinic acid/anhydride, n-hexenyl succinic acid/anhydride, n-dodecenyl succinic acid/anhydride, tetrapropenyl succinic acid/anhydride, polyisobutenyl succinic acid/anhydride, diisobutyl succinic acid/anhydride, n-hexyl succinic acid/anhydride, n-dodecyl succinic acid/anhydride, tetrapropyl succinic acid/anhydride, polyisobutyl succinic acid/anhydride.

Suitable hydroxide salts of the metals are e.g. lithium hydroxide, sodium hydroxide, potassium hydroxide, magnesium hydroxide, calcium hydroxide and barium hydroxide.

The claimed compounds are particularly suitable for the manufacture of cellular polyurethanes. The catalysts of the invention may be used alone, in combination with each other or with commercial catalysts which are appropriate for the production of polyurethanes and polyureas. Such commercial catalysts may be ones of the group of tertiary amines, phosphorus compounds and metal compounds.

Commercial catalysts are for instance the following amine catalysts: triethylenediamine, bis(dimethylaminoethyl)ether, dimethylcyclohexylamine, dimethylbenzylamine, dimethylethanolamine, N-methylmorpholine, N-ethylmorpholine, dimorpholinodiethylether, tetramethylhexamethylenediamine, 2-methyl-2-azanorbornane, 2-(hydroxyethoxyethyl)-2-azanorbornane, 2-(2-dimethylaminoethoxy)-ethanol, 3-dimethylaminopropyl-diisopropanol amine, bis(3-dimethylaminopropyl)-isopropanol amine and 2-dimethylaminoethyl-3-dimethylaminopropylether.

Commercial metal catalysts are e.g. metal salts, preferably tin, of a carboxylic acid and mixed alkyl—and carboxylic acid derivatives of a metal. For instance, dibutyl tin dilaurate, dibutyl tin diacetate, diethyl tin diacetate, tin dioctoate and mixtures thereof may be used.

Furthermore, a foam stabilizer may be added, particularly one of the class of silanes or siloxanes (U.S. Pat. No. 3,194,773).

For the manufacture of foamed polyurethanes using the catalysts of the invention, for instance the following polyisocyanates may be used: hexamethylene diisocyanate, phenylene diisocyanate, toluylene diisocyanate, isophorone diisocyanate, naphthylene diisocyanate and 4,4'-diphenylmethane diisocyanate. 2,4-toluylene diisocyanate, 2,6-toluylene diisocyanate and mixtures thereof are particularly suitable. Other suitable polyisocyanates are commercially available mixtures known as 'crude MDI' which are comprised of about 60% of the 4,4'-diphenylmethane diisocyanate and isomeric or analogous, higher-molecular polyisocyanates. Mixtures of toluylene diisocyanate, 4,4'-diphenylmethane diisocyanate and the polyisocyanates known as 'crude MDI' are also particularly appropriate. 'Prepolymers' of the aforesaid polyisocyanates which are comprised of the reaction products of polyisocyanates and polyether—or polyester polyols are also suitable.

The polyol component that is capable of reacting with the polyisocyanates may be a polyester polyol or a polyether polyol. Suitable polyols are e.g. polyalkylene—or polyester polyols. Particularly suitable polyalkylene polyols include polyalkyleneoxide polymers, such as polyethyleneoxide— and polypropyleneoxide polymers and mixed polymerized polyethylene—and polypropyleneoxide polymers. Starting compounds for said polyalkylene polyols are e.g. ethylene glycol, propylene glycol, 1,3-butanediol, 1,4-butanediol, 1,6-hexanediol, neopentyl glycol, diethylene glycol, dipropyleneglycol, pentaerythritol, glycerol, diglycerol, trimethylolpropane, cyclohexanediol, sucrose and saccharose.

Suitable polyester polyols include the reaction products of dicarboxylic acids with an excess of diols, e.g. adipic acid with ethylene glycol or butanediol, or the reaction products of lactones with an excess of a diol, e.g. caprolactone and propylene glycol.

The catalysts of the invention may also be used in combination with other catalysts, particularly in combination with tertiary amines, preferably those comprising at least one substituent having at least one hydrogen that is capable of reacting with the isocyanate group. Dimethylethanolamine, dimethylaminopropylamine, 2-(hydroxyethoxyethyl)-2-azanorbornane, 2-(2-dimethylaminoethoxy)-ethanol and 3-dimethylaminopropyl-diisopropanolamine are particularly preferred. Combinations with metal catalysts are also appropriate, preferably tin compounds of a carboxylic acid and/or mixed alkyl—and carboxylic acid derivatives of tin. Dibutyl tin dilaurate, dibutyl tin diacetate, diethyl tin diacetate, tin dioctoate and mixtures thereof are particularly preferred.

The following examples shall illustrate this invention.

EXAMPLE 1

Tetrapropenyl succinic acid dipotassium salt

Into a glass flask there were charged 16 grams of potassium hydroxide, 53.04 grams of ethyleneglycol and 37.04 grams of tetrapropenyl succinic anhydride. The mixture was stirred for two hours at 100° C.

Yield: 103 grams=97.1% of theoretical.

The catalyst solution thus obtained is hygroscopic. Therefore, the water content is 3.1% versus 2.5% of theoretical.

EXAMPLE 2

Hexenyl succinic acid dipotassium salt

Into a glass flask there were charged 16 grams of potasium hydroxide, 41.5 grams of ethyleneglycol and 25.5 grams of hexenyl succinic anhydride. The mixture was stirred for two hours at 100° C. Yield: 78.9 grams=98.0% of theoretical. The catalyst solution thus obtained is hygroscopic.

EXAMPLE 3

Use of the compounds described in Examples 1 and 2 as catalysts for the manufacture of flexible polyether foam (TDI/MDI cold-curing foam formulation)

The flexible polyether foam was prepared using the hand-mix technique. First, component A comprised of an appropriate polyol, a foam stabilizer, the amine catalyst of the invention and water as a blowing agent was stirred for 30 seconds with a high-performance stirrer at 5,000 r.p.m. The adequate amount of an appropriate polyisocyanate was then added. Stirring was continued for 3 seconds at 5,000 r.p.m. The foamable mixture was poured into a cubic mold (edge length: 27 cm). The rise curves were recorded by a measuring system coupled to an ultrasonic measuring probe. The cream times, rise times and rise heights were determined from the rise curves.

The following foam formulation was used:

Polyol (a) 100.0 grams

Diethanolamine 1.0 gram

Isocyanate (b) 37.8 grams

Water 3.0 grams

Stabilizer (c) 0.8 gram

Catalyst see Table I

Index 100

(a) branched polyol having an OH number of 26 to 30 and an average molecular mass of 6,000 g/mole
mixture of 80% by weight of toluylene diisocyanate (TDI) comprised of 80% by weight of 2,4-isomers and 20% by weight of 2,6-isomers and of 20% by weight of methylenediphenyl diisocyanate (MDI)
(c) polyether siloxane (2) catalyst of the invention according to Example 2

(3) potassium acetate (4) potassium-2-ethylhexanoate

Table II shows that particularly the tensile strength which is the essential characteristic with respect to load and durability of the foamed structural elements is significantly improved when using the catalysts I and II of the invention instead of prior art catalysts.

EXAMPLE 4

Use of the compounds described in Examples 1 and 2 as catalysts for the manufacture of flexible polyether foam (all-MDI cold-curing foam formulation)

The flexible polyether foam was prepared using the hand-mix technique. First, component A comprised of an appropriate polyol, a foam stabilizer, the amine catalyst of the invention and water as a blowing agent was stirred for 30 seconds with a high-performance stirrer at 5,000 r.p.m. The adequate amount of an appropriate polyisocyanate was then added. Stirring was continued for 3 seconds at 5,000 r.p.m. The foamable mixture was poured into a cubic mold (edge length: 27 cm). The rise curves were recorded by a measuring system coupled to an ultrasonic measuring probe. The cream times, rise times and rise heights were determined from the rise curves.

The following foam formulation was used:

Polyol (a) 100.0 grams

Diethanolamine 1.0 gram

Isocyanate (d) 52.0 grams

Water 3.0 grams

Stabilizer (c) 0.8 gram

Catalyst see Table III

Index 100

(a) branched polyol having an OH number of 26 to 30 and an average molecular mass of 6,000 g/mole
(c) polyether siloxane
(d) methylenediphenyl diisocyanate (MDI) comprising 4,4- and 2,4-isomers

TABLE 1

Foaming Characteristics

| Catalyst | Quantity [pphp] | Cream Time [s] | Gelation Time [s] Start | Gelation Time [s] End | Rise Time [s] | Density [kg/m$^3$] | Temperature [°C.] |
|---|---|---|---|---|---|---|---|
| I (1) | 1.5 | 6 | 35 | 42 | 116 | 34.3 | 22 |
| II (2) | 1.5 | 6 | 29 | 35 | 100 | 33.8 | 22 |
| III (3) | 1.5 | 7 | 20 | 24 | 52 | 35.1 | 22 |
| IV (4) | 1.5 | 5 | 51 | 69 | 249 | 32.3 | 22 |

TABLE II

Influence of the Catalyst on the Tensile Strength (in accordance with DIN 53571) of the Foam

| Catalyst | Tensile Strength [kPa] |
|---|---|
| I (1) | 90 |
| II (2) | 90 |
| III (3) | 62 |
| IV (4) | 72 |

(1) catalyst of the invention according to Example 1

TABLE III

Foaming Characteristics

| Catalyst | Quantity [pphp] | Cream Time [s] | Gelation Time [s] Start | Gelation Time [s] End | Rise Time [s] | Density [kg/m$^3$] | Temperature [°C.] |
|---|---|---|---|---|---|---|---|
| I (1) | 1.5 | 13 | 55 | 112 | 265 | 41.1 | 20 |
| II (2) | 1.5 | 12 | 48 | 94 | 202 | 41.4 | 20 |
| III (3) | 1.5 | 15 | 36 | 55 | 151 | 42.5 | 20 |
| IV (4) | 1.5 | 14 | 92 | 225 | 350 | 38.1 | 20 |

TABLE IV

Influence of the Catalyst on the Tensile Strength
(in accordance with DIN 53571) of the Foam

| Catalyst | Tensile Strength [kPa] |
|---|---|
| I (1) | 121 |
| II (2) | 131 |
| III (3) | 100 |
| IV (4) | 107 |

(1) catalyst of the invention according to Example 1
(2) catalyst of the invention according to Example 2
(3) potassium acetate
(4) potassium-2-ethylhexanoate Table IV shows that particularly the tensile strength which is the essential characteristic with respect to load and durability of the foamed structural elements is significantly improved when using the catalysts I and II of the invention instead of prior art catalysts.

We claim:

1. In a method for making polyurethanes by reacting a polyisocyanate and a polyol in the presence of a catalyst composition and, optionally, a foam stabilizer, the improvement which comprises employing a catalyst composition comprising a succinic acid compound of the general Formulas I or II

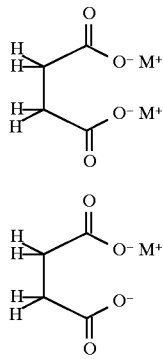

wherein R represents a branched or an unbranched alkyl group of 1 to 30 carbon atoms, a branched or an unbranched alkenyl group of 2 to 30 carbon atoms, or a branched or unbranched alkyl ether or alkenyl ether group of 2 to 30 carbon atoms and 1 to 6 oxygen atoms, $M^+$ represents a metal cation from the first main group of the periodic system, and $M^{++}$ represents a metal cation from the second main group of the periodic system.

2. The method of claim 1 in which R constitutes an alkyl group of 1 to 20 carbon atoms, an alkenyl group of 2 to 20 carbon atoms, or an alkyl ether or alkenyl ether group of 2 to 20 carbon atoms and 1 to 3 oxygen atoms.

3. The method of claim 1 in which R constitutes an alkyl group of 1 to 10 carbon atoms or an alkenyl group of 2 to 10 carbon atoms.

4. The method of claim 1 in which $M^+$ represents a sodium or potassium cation, and $M^{++}$ represents a calcium or magnesium cation.

5. The method of claim 1 in which $M^+$ in Formula I represents a potassium cation.

6. The method of claim 1 in which $M^{++}$ in Formula II represents a magnesium cation.

7. In a method for making polyurethanes by reacting a polyisocyanate and a polyol in the presence of a catalyst composition and, optionally, a foam stabilizer, the improvement which comprises employing a catalyst composition comprising a succinic acid compound of the general Formula I

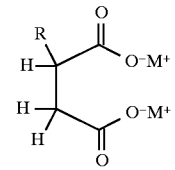

wherein R represents a branched or an unbranched alkyl group of 1 to 30 carbon atoms, a branched or an unbranched alkenyl group of 2 to 30 carbon atoms, or a branched or unbranched alkyl ether or alkenyl ether group of 2 to 30 carbon atoms and 1 to 6 oxygen atoms and $M^+$ represents a sodium or potassium cation.

8. The method of claim 7 in which R constitutes an alkyl group of 1 to 20 carbon atoms, an alkenyl group of 2 to 20 carbon atoms, or an alkyl ether or alkenyl ether group of 2 to 20 carbon atoms and 1 to 3 oxygen atoms.

9. The method of claim 7 in which R constitutes an alkyl group of 1 to 10 carbon atoms or an alkenyl group of 2 to 10 carbon atoms.

10. The method of claim 7 in which R constitutes tetrapropenyl or hexenyl.

11. In a method for making polyurethanes by reacting a polyisocyanate and a polyol in the presence of a catalyst composition and, optionally, a foam stabilizer, the improvement which comprises employing a catalyst composition comprising a succinic acid compound of the general Formula II

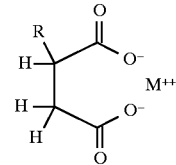

wherein R represents a branched or an unbranched alkyl group of 1 to 30 carbon atoms, a branched or an unbranched alkenyl group of 2 to 30 carbon atoms, or a branched or unbranched alkyl ether or alkenyl ether group of 2 to 30 carbon atoms and 1 to 6 oxygen atoms and $M^{++}$ represents a calcium or magnesium cation.

12. The method of claim 11 in which R constitutes an alkyl group of 1 to 20 carbon atoms, an alkenyl group of 2 to 20 carbon atoms, or an alkyl ether or alkenyl ether group of 2 to 20 carbon atoms and 1 to 3 oxygen atoms.

13. The method of claim 11 in which R constitutes an alkyl group of 1 to 10 carbon atoms or an alkenyl group of 2 to 10 carbon atoms.

14. The method of claim 11 in which R constitutes tetrapropenyl or hexenyl.

* * * * *

UNITED STATES PATENT AND TRADEMARK OFFICE
CERTIFICATE OF CORRECTION

PATENT NO. : 5,807,958
DATED : 15 September 1998
INVENTOR(S) : Klaus Diblitz and Peter Finmans It is certified that error appears in the above-identified patent and that said Letters Patent is hereby corrected as shown below:

Claim 1, Formulas I and II should appear as follows:

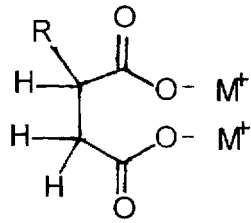 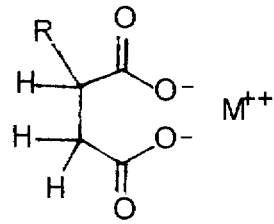

I                            II

Signed and Sealed this

Ninth Day of March, 1999

*Attest:*

*Attesting Officer*

Q. TODD DICKINSON

*Acting Commissioner of Patents and Trademarks*